United States Patent Office 3,826,829
Patented July 30, 1974

3,826,829
SLUSH BEVERAGES CONTAINING FINE-GRAINED ICE CRYSTALS
Anthony J. Marulich, Pequannock, N.J., assignor to General Foods Corporation, White Plains, N.Y.
No Drawing. Filed Nov. 17, 1970, Ser. No. 90,482
Int. Cl. A23l 1/04
U.S. Cl. 426—190     3 Claims

ABSTRACT OF THE DISCLOSURE

Liquid beverage formulations which may be consumed as either a conventional soft drink or as a soft frozen slush beverage containing fine-grained ice crystals are produced. These liquid formulations, which may if desired be carbonated, are formed with water, sugars, polyols, flavor and color agents, and an effective amount of a stabilizing agent which includes pectin in combination with other gums.

BACKGROUND OF THE INVENTION

Recently, the slush-type beverage has attained pronounced popularity and has become a widely accepted food product. This type of beverage is especially appealing to children and may currently be purchased through many outlets in a wide selection of flavors. Methods and equipment have been developed to dispense the commercially distributed slush beverages into a single serving container, in both carbonated and non-carbonated form, for consumption at or near the place of sale.

These slush beverages, composed of ice crystals distributed throughout a sweetened and flavored aqueous matrix, are endowed, in addition to their refreshing, cooling and thirst-quenching effect, with excellent eye appeal, especially when viewed in the heat of the day in warm climates.

The outstanding disadvantages of conventional slush beverages, however, lie in their need for constant mechanical agitation in order to prevent agglomeration of the ice crystals prior to sale and in the fact that, to be fully enjoyed, they must be consumed soon after purchase and, as such, in or near the location where they are dispensed. Unlike ice cream which can be protected with a suitable inexpensive insulating wrapper or sack, these slush beverages quickly revert to a completely liquid form and, therefore, cannot be conveniently transported after purchase to a more desirable place, such as the home, for complete enjoyment. Any attempt to partially re-freeze these melted (liquid) slush beverages results in a disappointing mass of a few large agglomerates of ice which form a separate phase of material atop a heavy, syrupy, liquid phase. This is in contradistinction to the original slush beverage wherein the ice crystals are subdivided and maintained in a state of substantially uniform dispersion by the effective mixing accomplished by the mechanical agitation employed in the commercial dispensing equipment. In many respects the problem is similar to that of refreezing melted ice cream—failure due to the separation and growth of large ice crystals.

Consequently, there has existed a need for a beverage which can be marketed as a containerized liquid and designed to be conveniently converted to the partially frozen state in the home freezer to produce a slush beverage equal or superior to the conventional slush beverages in taste, quality, appearance and texture. Such a slush beverage should be composed of a large quantity of small ice crystals uniformly dispersed throughout a colorful and flavorful liquid phase and should be capable of being enjoyed at home.

It has also been found desirable to produce a product which may be consumed in the conventional refrigerated condition as well as in the partially frozen, slush condition.

The terms "partially frozen" and "partially freezing" are intended to describe the bringing of the aqueous mixture to a semi-hardened or spoonable physical state in which ice crystals are dispersed throughout a liquid matrix. In other words, the beverage is in a semi-liquefied or slush state.

When conventional canned carbonated beverages are placed in a freezer, ice crystals are formed which migrate to the uppermost part of the can and ice formation moves progressively downward from that point. This action of freeze concentration forces dissolved carbon dioxide gas out of solution and forces the high solids syrup containing color and flavor to the bottom of the can.

If the can of frozen beverage is then opened from the top, a thick layer of ice is found in the upper portion of the can; however, eventually the pressure of the free carbon dioxide will cause a piston-like action on the ice and force it out of the can. This ice layer is made up of brittle, platlet ice crystals termed "shale" ice which is unpleasant to eat and contains very little color or flavor. If the frozen can is opened from the bottom, violent spurting or gushing occurs immediately as the free carbon dioxide expells the concentrated flavor syrup.

It has been known that the presence of hydrophilic colloids, such as edible gums, in conventional soft drinks are useful in preventing the above-mentioned freeze concentration effect. It is thought that as the beverage is converted to slush form, the hydrophilic colloid assists in increasing the viscosity of the liquid material remaining after ice crystals are formed. This increase in viscosity serves to prevent migration of the ice crystals thus maintaining a uniform dispersion of ice crystals throughout a liquid matrix.

It has remained a problem, however, to control ice crystal structure in these frozen carbonated beverages. It is desirable to avoid the formation of large, shale-like ice crystals and to obtain a creamy, smooth, fine-grained ice crystal structure much like that present in sherbet.

Additionally it has been a problem to produce a slush beverage which is also suitable for consumption as a chilled liquid. Previous attempts to produce liquid formulations which produce slush beverages when frozen resulted in liquids which possessed an undesirably high viscosity. Such high viscosity liquids do not meet with consumer acceptance as refrigerated, soft drink beverages.

SUMMARY OF THE INVENTION

It has been discovered according to this invention that carbonated beverage formulations can be produced which are acceptable both as a refrigerated soft drink and as a partially frozen "slush" beverage. The formulations of this invention contain as an essential component from about 0.5% to about 2.0% by weight of total solids of a stabilizer which consists of pectin in combination with other natural or chemically modified gums.

The formulations produced according to this invention will preferably contain about 15% to 20% by weight of solids compared to the approximately 10% to 12% solids found in conventional soft drinks. By employing the teachings of this invention, however, formulations containing this high level of solids can be produced which are still acceptable, in terms of mouthfeel, as refrigerated beverages as well as being able to form slushes having a fine-grained ice crystal structure.

A study of various stabilizer systems has indicated that pectin in combination with other gums is singularly effective in regulating the ice crystal structure of the slush to the desirable sherbet-like consistency. The combination of pectin plus other gums has proven to be more desirable than the use of pectin alone. The use of stabilizers not containing pectin have not been found acceptable for the purposes of this invention. It has additionally been found that the preferred ratio of pectin to other gums lies within the range of about 5:1 to 20:1 and most preferably at about 10:1.

It is an object of this invention to provide a carbonated beverage which may be consumed either as a chilled liquid or as a partially frozen, slush beverage.

It is another object of this invention to provide a bifunctional carbonated beverage which when stored in a home freezer converts to a slush beverage having a fine-grained ice crystal structure.

These and other objects of the invention will become apparent from the description herein.

DESCRIPTION OF THE INVENTION

This invention deals with a shelf-stable carbonated soft drink that has bifunctional uses. It can be drunk, as is, after conventional chilling or it can be consumed as a soft frozen carbonated beverage ice commonly referred to as "slush."

According to this invention it has been found that carbonated beverage formulations containing about 15% to 20% solids and wherein these solids are comprised of soluble carbohydrates such as sugars, stabilizers containing pectin and at least one other natural or chemically modified gum, and other edible materials such as buffering agents, food acids, preservatives, flavors and colors.

The preferred amount of stabilizer according to this invention will be from about 0.5% to 2% of the solids content of the beverage. This stabilizer being formulated from pectin and other gums such that from about 0.4% to 1% of the beverage solids consist of pectin and from 0.05% to 0.2% of the beverage solids consist of other gums. Preferably the ratio of pectin to other gums will be in the range of from 5:1 to 20:1 and most preferably will be about 10:1. Suitable other gums for use in combination with pectin include locust, bean, guar, tragacanth, karaya, carageenan, sodium alginate, and the like.

It has also been found that the addition of such freezing point depressant materials as alchols, particularly the polyhydric alcohols such as propylene glycol, sorbitol, glycerol and the like and combinations thereof appear to assist in obtaining a fine-grained ice crystal structure in the carbonated slush beverages of this invention. These depressant materials apparently act to retard the freezing of the solution until a temperature, sufficiently low to form the desired small ice crystals is reached. Alcohols will, when used, be employed in the liquid formulations of this invention in the amounts of about 5% to 25% by weight of the solids.

The aqueous formulations contemplated by this invention contain on a percent weight basis the following essential ingredients:

Beverage:
| | |
|---|---|
| Water | 80–85 |
| Solids | 15–20 |

Solids:
| | |
|---|---|
| Soluble carbohydrates | 60–90 |
| Polyhydric alcohol | 5–25 |
| Pectin | 0.4–1 |
| Gums (non-pectin) | 0.05–0.2 |
| Flavor-color | As desired |

The liquid mixtures included in the formulations given above may be containerized, such as in metal cans or plastic bottles, together with from about 1.5 to 3.0 volumes of $CO_2$, and marketed as a shelf-stable product. The product purchased by the consumer serves a dual function of being capable of being served either as a chilled liquid beverage or, after being stored in a home freezing unit (about 0° F. to 15° F.) for at least 4 hours, as a slush beverage.

The desirability of formulating beverages according to the compositional limitations of this invention have been shown by examining the ice crystal structure of various formulations wherein the stabilizer was the sole variable. It was found that without any stabilizer the liquid froze solid. The use of stabilizers not containing pectin yield slush beverages having coarse shale ice particles. When the stabilizer consists solely of pectin, the ice crystal structure is somewhat improved in that the ice particles are a less coarse shale ice. However, when pectin is combined with other gums in accordance with the teachings of this invention, slush beverages may be produced which contain creamy, fine-grained ice particles similar to sherbet.

It has additionally been found that by judicious selection of the particular pectin and other gums employed in the formulations of this invention the viscosity of the liquid may be slightly adjusted. Since it is desired to have the liquid formulations of this invention acceptable as chilled beverages as well as slushes, viscosity of the liquid should not be excessive. Improved results in the nature of lower viscosity have been obtained when low methoxyl pectin is used in the stabilizer formulation.

An example of a specific formulation for the bifunctional beverage of this invention comprises:

EXAMPLE 1

| | Weight percent |
|---|---|
| Water | 81.36 |
| Solids | 18.64 |

Solids:
| | |
|---|---|
| Dextrose | 71.00 |
| Sucrose | 10.57 |
| Glycerol | 11.52 |
| Low methoxyl pectin | 0.64 |
| Gum (5 parts guar to 3 parts CMC) | 0.06 |
| Orange flavor-color | 0.59 |
| Ethyl alcohol | 2.68 |
| Citric acid | 0.80 |
| Buffer (sodium phosphate) | 1.66 |
| Preservative (sodium benzoate) | 0.32 |
| Cloud agent | 0.16 |

The formulation of Example 1 was carbonated and canned using known techniques.

This carbonated formulation is rated as an acceptable chilled beverage having a mouthfeel similar to conventional soft drinks. When cans of the carbonated beverage were placed in a home freezing unit overnight and then opened, no gushing occurred and an excellent slush having very creamy fine-grained ice particles was obtained.

Having thus described the invention what is claimed is:

1. A carbonated liquid suitable for producing a slush beverage having a fine-grained ice crystal structure and also suitable for consumption as a carbonated soft drink consisting of an aqueous solution containing from 15% to 20% solids and wherein said solids contain from 60% to 90% by weight of soluble carbohydrates, from 0.4% to 1% by weight of a low methoxyl pectin, from 0.05% to 0.2% by weight of other gums, the ratio of pectin to other gums being from 5:1 to 20:1, and from 5% to 25% by weight of polyhydric alcohols.

2. A carbonated beverage according to claim 1 wherein said alcohol is glycerol.

3. A carbonated beverage according to claim 1 wherein the ratio of pectin to other gums is about 10:1.

References Cited

UNITED STATES PATENTS

| | | | |
|---|---|---|---|
| 3,503,757 | 3/1970 | Rubenstein | 99—136 |
| 2,168,934 | 8/1939 | Haskins et al. | 99—136 |
| 1,878,203 | 9/1932 | Turnbow | 99—136 |
| 3,477,244 | 11/1969 | Scoggins | 99—136 |
| 3,073,703 | 1/1963 | Dunn | 99—192 |

OTHER REFERENCES

Chemicals Used In Food Processing, Nat. Acad. of Sciences, 1965, p. 34.

S. LEON BASHORE, Primary Examiner

A. L. CORBIN, Assistant Examiner

U.S. Cl. X.R.

426—327, 365